(12) United States Patent
Crommen et al.

(10) Patent No.: US 6,698,485 B1
(45) Date of Patent: Mar. 2, 2004

(54) DEVICE FOR DE-AIRING LAMINATES

(75) Inventors: Jan H. L. Crommen, Enfield, CT (US); Swaminathan S. Kalyana, Northampton, MA (US)

(73) Assignee: Solutia, Inc., St. Louis, MO (US)

( * ) Notice: Subject to any disclaimer, the term of this patent is extended or adjusted under 35 U.S.C. 154(b) by 161 days.

(21) Appl. No.: 09/736,340

(22) Filed: Dec. 15, 2000

(51) Int. Cl.7 .................................................. B32B 31/00
(52) U.S. Cl. ........................ 156/382; 156/104; 156/105; 156/286
(58) Field of Search .......................... 156/87, 104, 105, 156/286, 382, 285, 381, 108, 109; 141/65

(56) References Cited

U.S. PATENT DOCUMENTS

| | | |
|---|---|---|
| 1,870,284 A | 8/1932 | Drake |
| 2,948,645 A | 8/1960 | Keim ........................ 154/2.7 |
| 2,992,953 A | 7/1961 | Talburtt ........................ 154/2.7 |
| 3,074,466 A | 1/1963 | Little ........................ 156/382 |
| 3,074,838 A | 1/1963 | Little ........................ 156/104 |
| 3,100,173 A | 8/1963 | Boicey et al. ............... 156/579 |
| 3,234,062 A * | 2/1966 | Morris ........................ 156/104 |
| 3,249,479 A | 5/1966 | Boicey ........................ 156/83 |
| 3,281,296 A | 10/1966 | Jameson ....................... 156/104 |
| 3,852,136 A | 12/1974 | Plumat et al. ............... 156/103 |
| 4,398,979 A | 8/1983 | Cathers et al. ................ 156/87 |
| 4,624,731 A | 11/1986 | Ash et al. ..................... 156/382 |

* cited by examiner

*Primary Examiner*—Michael W. Ball
*Assistant Examiner*—John L. Goff
(74) *Attorney, Agent, or Firm*—Fitzpatrick, Cella, Harper & Scinto (57) ABSTRACT

A device for fast, easy and cost-effective de-airing of different shape, size and thickness laminates that comprises a flexible vacuum ring with a built-in longitudinal channel that can be matingly mounted about a periphery of a multi-ply laminate, and a male connector part attached to one end of the flexible vacuum ring, where the male connector is shaped such that the longitudinal channel can slide onto the male connector to form an airtight seal while still providing gas flow through the flexible vacuum ring mounted about the periphery of the laminate. The device can be readily applied to and removed from the assemblies to be laminated, and is constructed to be applicable to any size, shape or thickness laminate, particularly the one with sharp corners.

19 Claims, 6 Drawing Sheets

DEVICE FOR DE-AIRING LAMINATES

BACKGROUND OF THE INVENTION

1. Field of the Invention

This invention relates to a device that can be readily used for de-airing multi-ply laminates of different shapes, thickness, and sizes. Today, multi-ply laminates are widely used in industry and consumer products. For example, automobile windshields and some building windows are made from laminated glass in order to improve safety or security. Unlike ordinary glass, upon impact laminated glass will not shatter but will only break or crack.

2. Related Background Art

Laminated glass is usually made of one or more sheets of thermoplastic material, such as polyvinyl butyral ("PVB"), bonded to two sheets of glass, forming a so-called "sandwich" structure. To be used, for example, as an automobile windshield, the laminated glass must be made optically transparent. Typically, the surfaces of the inner polymer are uneven and when the sheets are pressed together during lamination, air bubbles are trapped in the uneven portions, decreasing the transparency of the final product. In order to eliminate the deleterious air bubbles, an evacuation system must be constructed to "de-air" the multi-ply laminate.

In a typical de-airing technique, an assembly is enclosed within a closed ring comprising one or more channel-shaped members of a fluid-impervious material (such as rubber). Various types of de-airing rings are known.

U.S. Pat. No. 1,870,284 to Drake discloses the use of rigid peripheral evacuation chambers to apply suction to two adjacent sides of an assembly of glass and inter-layer sheets to evacuate air from the interfaces between the sheets during lamination. These evacuation chambers had to be aligned exactly with the side faces of the assembly, perfectly matching their thickness because of a lack of flexible lips that engage the outside major surfaces of the assembly.

U.S. Pat. No. 2,948,645 to Keim discloses using a de-airing ring comprising an endless flexible, air-impervious channel-shaped member having flexible lips that fit over the outer edge portions of an assembly of curved glass sheets and a flexible interlayer sheet to be laminated. This patent requires that the evacuation channel extend around the complete periphery of the assembly. Thus, each different outline shape of an assembly to be laminated requires a different shape for the channel shaped member that defines the evacuations chamber.

Other patents that describe enclosing the peripheral edge of an assembly to be laminated within the lips of a de-airing ring comprising a flexible channel member include U.S. Pat. Nos. 3,074,466 and 3,074,838 to Little, U.S. Pat. No. 3,100,173 to Boicey et al., U.S. Pat. No. 3,234,062 to Morris, U.S. Pat. No. 3,249,479 to Boicey, U.S. Pat. No. 3,281,296 to Jameson, U.S. Pat. No. 3,852,136 to Plumat et al. and U.S. Pat. No. 4,624,731 to Ash et al.

In these patents, the flexible channel members extend continuously around the periphery of the assembly to be laminated. This approach suffers from a deficiency in that it necessitates using a different size ring for a different size laminate. Since the ring must surround the periphery of the laminate and then be attached to the vacuum pump, that ring will no longer be sufficient to provide an airtight connection with the glass when the size of the laminate changes. Therefore, it is necessary to maintain an inventory of flexible channel members for each production pattern. The storage and inventory problem is tremendous. Also, the fabrication of such channel members is expensive, requiring a separate mold for each pattern if the channel member is made as a single piece, or from several molds followed by a vulcanizing step, if the channel member is made in several sections.

In addition, it is not believed that the systems described in the above listed patents could be employed for negotiating a sharp corner without a specific, integrated ring corner piece that may or may not be an inherent part of the ring construct. It is further believed that the materials that comprise and/or the shape of the vacuum channels in the prior art are as such that negotiating a sharp corner without a fitted ring corner piece would likely block air flow or eliminate a tight seal between the ring and the glass that would result in a loss of vacuum, thereby negating the purpose for having an evacuation system.

U.S. Pat. No. 2,992,953 (Talburtt) describes a de-airing ring made of flexible channeled tubing, wrapped about most of the periphery of a laminate, and a grooved supporting strip that is attached to the remaining exposed edge of the laminate. The invention covered by this patent represents an improvement over the endless rings of the other patents in that the Talburtt de-airing ring is not limited to a specific size and it, allegedly, is not as difficult or time consuming to apply as the endless rings of the other patents. Instead, the Talburtt de-airing ring is applied by mounting a bottom edge of the assembly into the grooved supporting strip, applying the flexible channel tubing about the remainder of the periphery of the assembly and clamping appropriate portions of the flexible channel tubing to the ends of the grooved supporting strip. A portion of the flexible channel tubing is left beyond each clamped portion. Different lengths of flexible channel tubing remain for different patterns depending on the length of the perimeter of the assembly to be laminated.

The Talburtt invention, however, is limited in its application to automobile windshields that have an edge straight enough to be received within the grooved supporting strip and corners of sufficiently rounded configuration to enable the application of the flexible channel tubing to the periphery of the assembly without having the tubing buckle in the vicinity of any sharp corners. The Talburtt de-airing rings would not likely be suitable for laminating windows of a rectangular or polygonal configuration that has sharp corners, such as those used in buildings.

U.S. Pat. No. 4,398,979 (Cathers et al.) attempts to overcome many of the above described issues that are involved in making large and variably sized windows with sharp corners. This patent describes a laminating method using a plurality of channel-shaped members and connecting channel-shaped connection pieces all attached to the periphery of a laminate. However, Cathers et al. is still plagued by deficiencies. It requires new channel-shaped and connecting members for each laminate of different shape and size. This escalates production costs, increases storage needs and lengthens the time period required to replace the old members in order to conduct another lamination. Even a single laminate requires multiple members in order to carry out the lamination. For example, a rectangular laminate would necessitate four channel-shaped members and four connecting members that have to be specifically fitted for the angles and dimensions of this particular laminate. This approach also significantly increases the potential for air/vacuum leaks because multiple connecting pieces are employed.

The use of laminated glass is widespread. An urgent need exists for a new, cost-effective de-airing device that is easily adjustable to fit laminates of different shapes, sizes and thickness. Particularly, a device is needed to de-air laminates with sharp corners and large architectural window panels. The present invention meets these needs.

SUMMARY OF THE INVENTION

This invention is directed to a de-airing ring comprising: a) a flexible vacuum ring having a longitudinal channel imbedded therein that can be matingly mounted about a periphery of a laminate; b) a male connector attached to one end of the flexible vacuum ring; c) at least one vacuum connection port communicating with the longitudinal channel.

The male connector is designed and shaped to slidingly engage the longitudinal channel of the vacuum ring at any location along its length to form an airtight seal while enclosing the ring around the periphery of an assembly of the multiply laminate, and to provide gas flow through the flexible vacuum ring mounted about the periphery of the laminate.

Also provided is a device for de-airing laminates of different shapes, sizes, and thickness where a male connector further comprises a connector channel, fluidly engaging the longitudinal channel at one end of the flexible vacuum ring, to provide gas flow through the flexible vacuum ring mounted about the periphery of the laminate.

DETAILED DESCRIPTION OF THE INVENTION

The present invention is directed to a device for readily de-airing laminates of different shapes, sizes and thickness.

Figure 1:
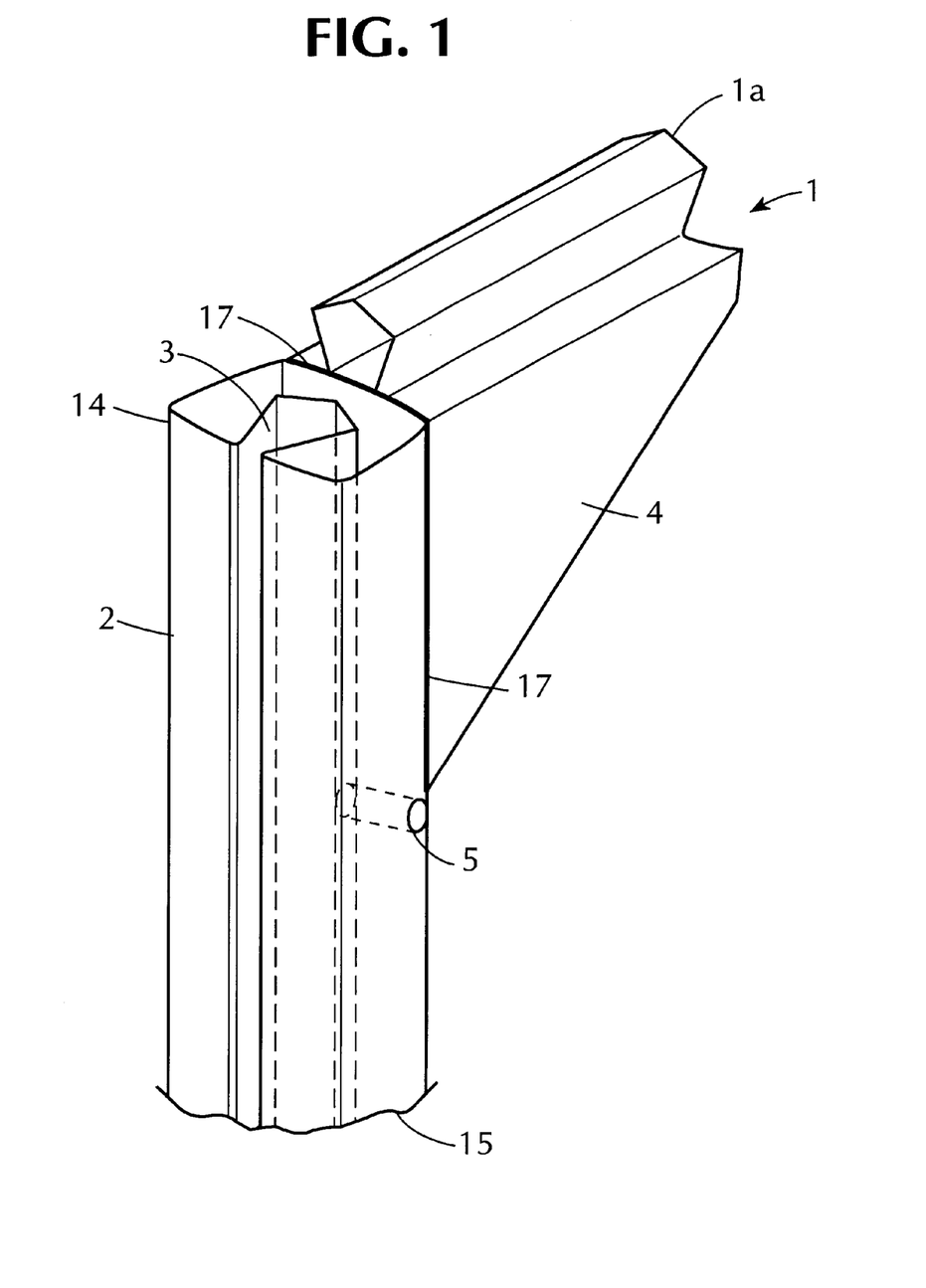
FIG. 1 is a perspective view of a device according to the present invention.
Figure 2:
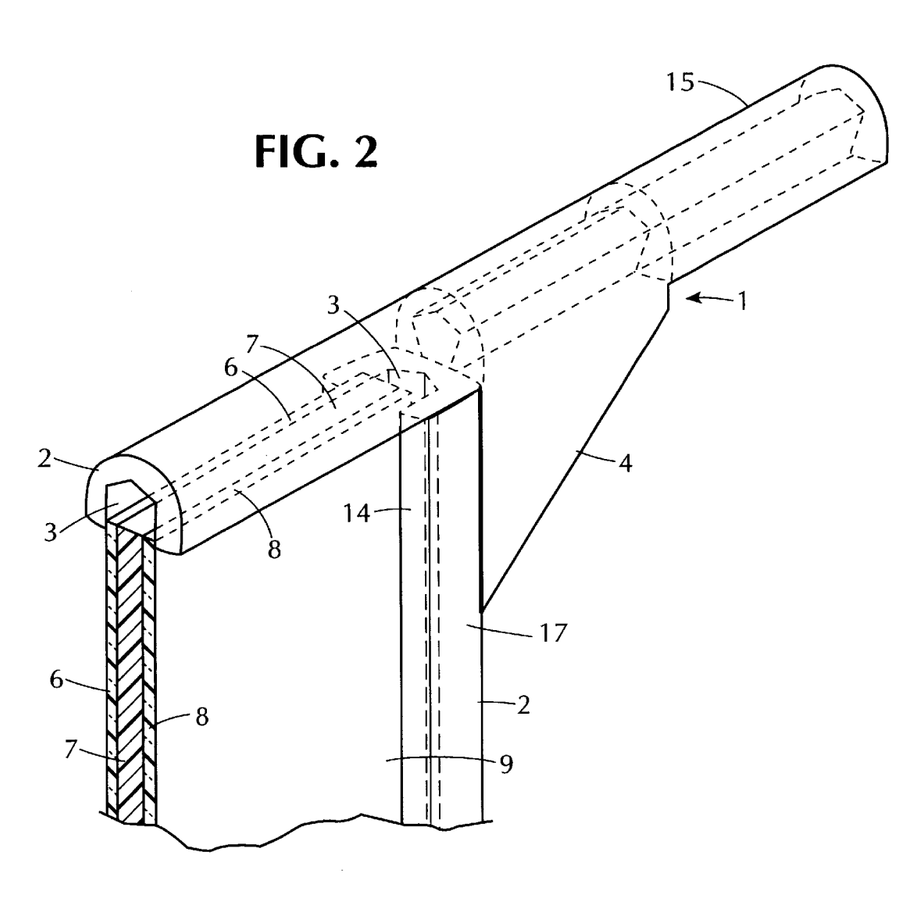
FIG. 2 is a perspective view of a device according to the present invention when mated to the laminate.

Laminated glass 9 is made of one or more polymer sheet 7, typically PVB, bonded on both sides to two sheets of glass 6, 8 (FIG. 2). In order to manufacture laminated glass, air that is present between the polymer sheet 7 and the glass sheets 6, 8 must be evacuated. The present invention provides a device that allows fast and cost effective de-airing during lamination, and this single device also easily accommodates and can be applied to multi-ply laminates of different shapes, sizes and thickness. This device comprises a male connector 1 attached by, for example, gluing, welding, molding, etc., to one end 14 of a flexible vacuum ring 2. A weld line 17 joining the end 14 of ring 2 with the male connector 1 is illustrated in FIG. 1. The attachment of the male connector 1 to the ring 2 may be made in such a manner that the stopper portion 1a of the male connector 1 forms an angle with the ring 2 of about 30° to about 150°, preferably about 45° to about 135° and most preferably about 90°, i.e., the stopper portion 1a is substantially perpendicular to the ring 2 at the point of attachment as shown in FIG. 1. Optionally and preferably, a support 4 may be used to attach or enhance attachment of the male connector 1 to the ring 2. The support 4 may be an integral part of male connector 1, i.e., stopper portion 1a and support 4 are for example a single molded piece, or the support 4 and male stopper 1a may be two pieces that are joined together, for example, by gluing, welding or fasteners.

The ring has a longitudinal channel 3, as shown in FIGS. 1 and 2, which is sized to receive, but not necessarily exactly fit, a peripheral portion of the laminate 9. The flexible vacuum ring 2 is gradually mounted about an entire periphery of the laminate 9 starting from the one end 14 of the ring.

Figure 3:
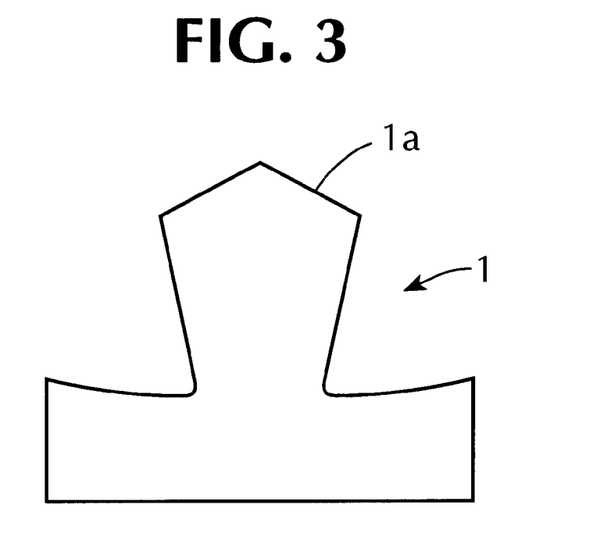
FIG. 3 is a cross-sectional view of a male connector according to the present invention.
Figure 4:
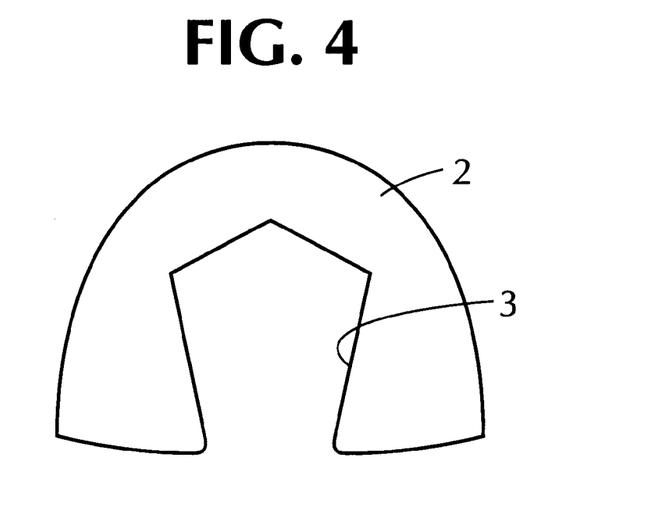
FIG. 4 is a cross-sectional view of a flexible vacuum ring channel according to the present invention.

In order to evacuate the air from the laminate 9, a closed system must be achieved around the laminate. As seen in FIGS. 3 and 4, the male connector 1 is shaped such that it substantially matches the shape of the longitudinal channel 3. Thus, when the flexible vacuum ring 2 completely surrounds the laminate 9, the flexible vacuum ring can slide onto the male connector 1 at any point along its length, forming an airtight seal while still maintaining a gas flow system around the periphery of the laminate through the portion of the longitudinal channel 3 mounted about the laminate 9.

Since any part of the longitudinal channel 3 can slide onto the male connector 1, the device need not be restricted to any specific length to fit a particular laminate, and it can consequently be applied to laminates of different shapes, sizes and thickness. The extending end 15 of the flexible vacuum ring 2 can be used to slidingly adjust the ring to completely mate about the periphery of the laminate. The size of the flexible vacuum ring 2 and the longitudinal channel 3 are such that the device can accommodate a laminate of variable thickness. In addition, the properties of the materials used in constructing the de-airing device enable the ring 2 to negotiate sharp-angled, non-rounded laminate corners without blocking the air flow or breaking the tight seal between the ring and the glass, which would invariably result in a loss of vacuum. Consequently, the design and construction materials featured in this invention avoid the need for a fixed size ring or specific multiple corner pieces that the other proposed de-airing systems necessitate.

To ensure that the device can be applied quickly and easily, and to assure that the vacuum channel 3 is sealed completely by the male connector 1, a preferred embodiment of the present invention has a support member 4 as a part the male connector 1, as shown in FIGS. 1 and 2. The support member serves to enhance the integrity of the connection of the male connector 1 to the vacuum ring 2 and can take any shape or size. Preferably, the support member 4 is triangular in shape and made of a resilient flexible material. Such materials include, but are not limited to, silicone rubber, natural rubber, olefinic rubbers, elastomers, etc.

After the ring 2 is fitted onto the laminate 9, the air needs to be evacuated. For that purpose, the ring 2 has at least one vacuum connection port 5 that communicates with the longitudinal channel 3. In a preferred embodiment of the present invention, a vacuum connection port 5 is disposed at, or close to, one end 14 of the flexible vacuum ring 2, adjacent or close to the male connector 1, as shown in FIG. 1. A suction source (not shown), preferable a vacuum pump, is connected to the vacuum connection port 5. The suction source is then engaged to remove the remaining air, so that the laminate can be produced without deleterious air bubbles or without excessive air being dissolved in the polymer interlayer. Preferably, the longitudinal channel provides a continuous path about the laminate, although it is also possible to interrupt that continuous path, e.g., with the male connector.

The present invention provides a means for de-airing laminates of different dimensions, such as rectangular, multi-sided or a combination of curved and straight sheets. Preferably, the ring is at least 3 feet (0.9 meters) and preferably greater than 6 feet (1.8 meters) long, so that laminates with relatively large circumferences can be processed. An optimally shaped longitudinal channel 3, as shown in FIG. 4, permits the ring to negotiate laminates that have curves or sharp angles without blocking the circulation or collapsing due to vacuum and maintain a tight fit around the periphery of the glass. Of course, different shaped longitudinal channels can be used so long as the vacuum seal may be maintained with the laminate.

Specifically, the present invention can be used for laminates that have sharp corner angles of about 30° to about 150°, preferably about 45° to about 135°. Preferably, the flexible vacuum ring 2 is made of rubber with durometer hardness between 20 and 45 units.

Figure 5:
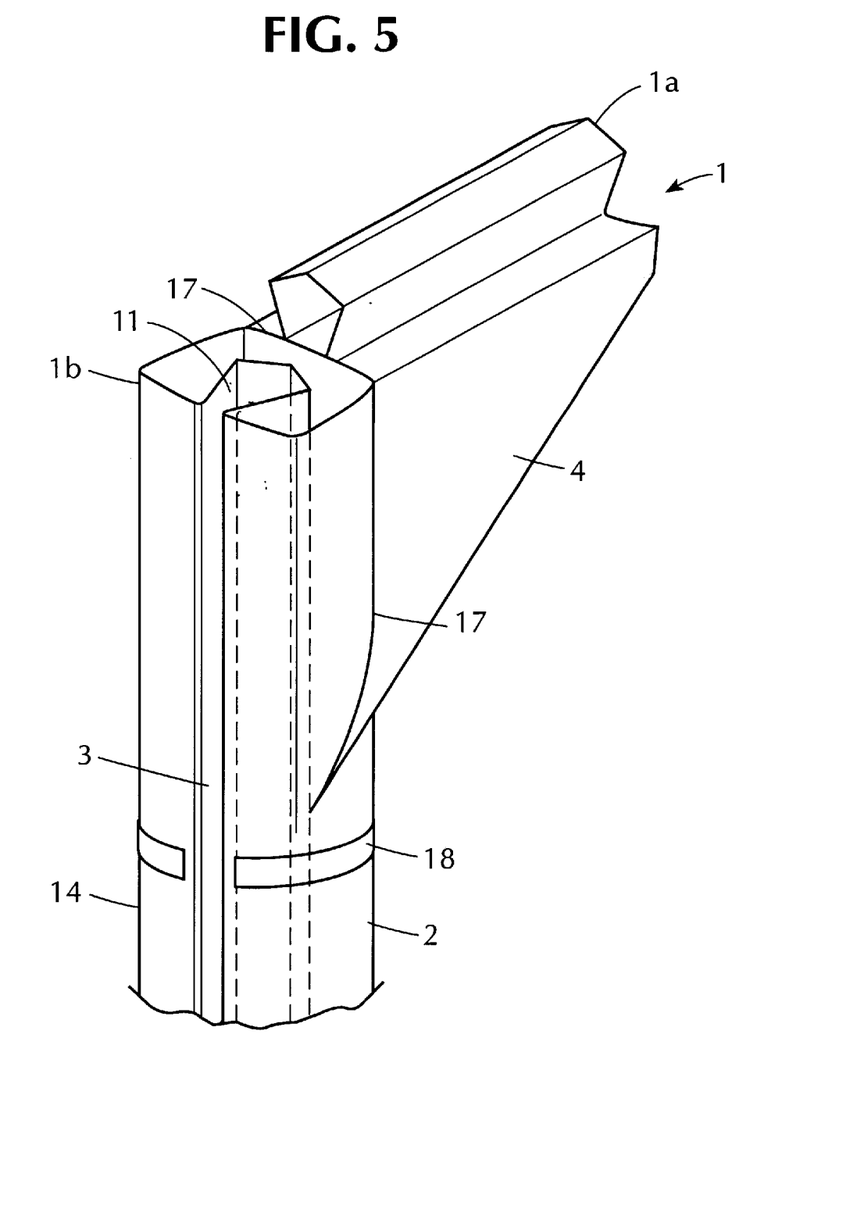
FIG. 5 is a perspective view of yet another embodiment of the present invention.

In a separate embodiment a connector channel 11 as part of male connector 1 fluidly engages the longitudinal channel 3, as shown in FIG. 5. In this embodiment, the ring stopper portion 1a of the male connector 1 can make an angle with connector portion 1b in a range similar to that previously described for the male connector 1 and the ring 2 in the embodiment illustrated in FIG. 1. Preferably, the connector portion 1b, which has the connector channel 11 embedded therein, is substantially perpendicular to the ring stopper portion 1a of the male connector 1. In a further preferred embodiment support member 4 connects the stopper portion 1a and the connector portion 1b, resulting in increased agility of the male connector 1. The added support and resiliency of the male connector 1 in this embodiment improves the speed with which the device can be applied to the laminate without sacrificing the device's flexibility or narrowing the range of its applicability.

In this embodiment, the connector channel 11 has a shape substantially identical to the longitudinal channel 3. This allows the connector portion 1b of the male connector 1 to mate around the periphery of the laminate in a similar fashion to the flexible vacuum ring 2. The one end 14 of the ring is attached to the connector portion 1b of the male connector 1. This connection can be made using a connector clamp 18. Similarly, the connector portion 1b could include a sleeve for accepting the end 14 of ring 2 to make the desired connection. Thus, when the ring is gradually applied around the glass laminate and then slid onto the stopper portion 1a of the male connector 1, the closed system is preserved. However, it should be noted that a complete circulating system is not necessary. The device will still function even if the longitudinal channel 3 is blocked at one or more points along the periphery of the laminate so long as suction can be applied to a substantial portion of the periphery of the laminate.

Figure 6A:
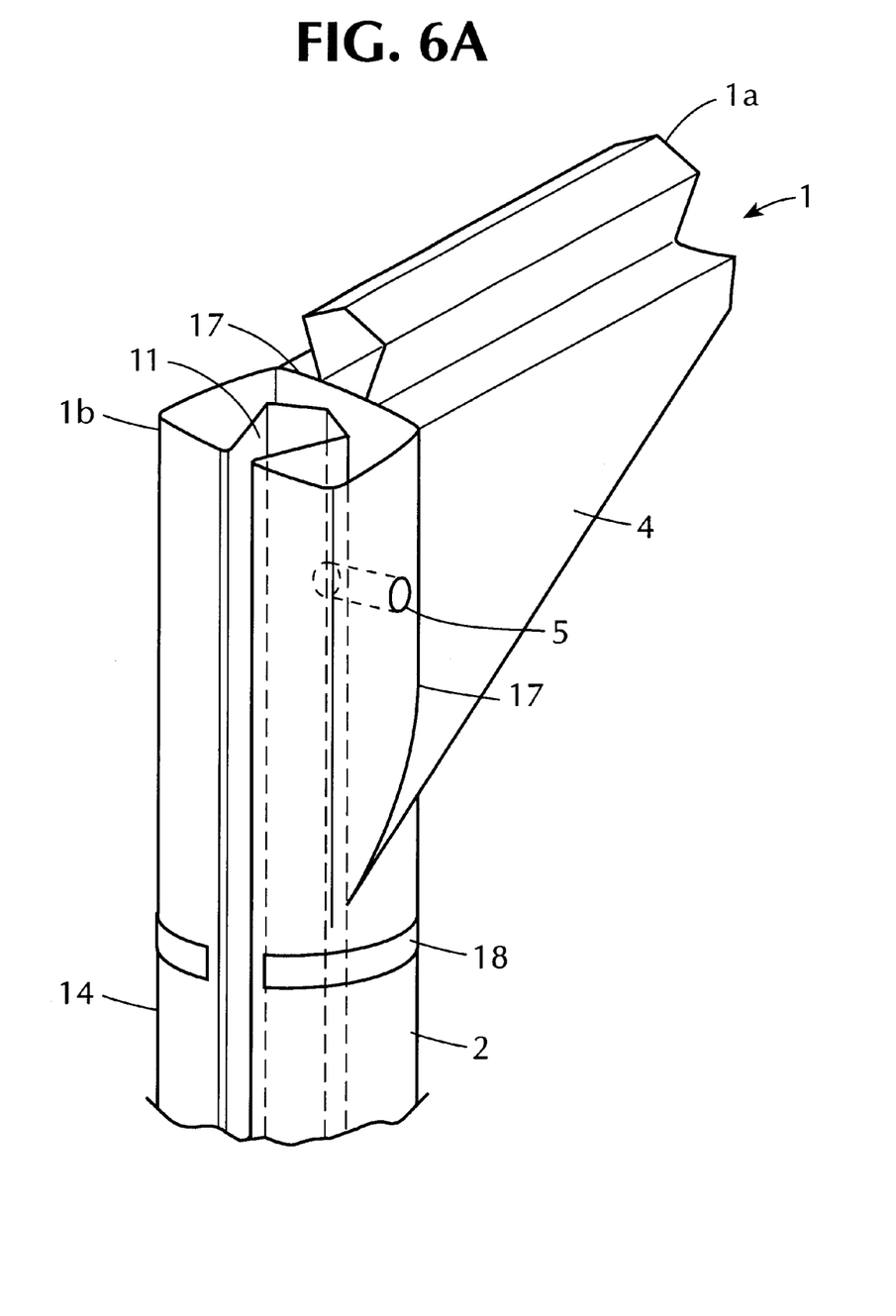
FIG. 6A is a perspective view of yet another embodiment of the present invention.
Figure 6B:
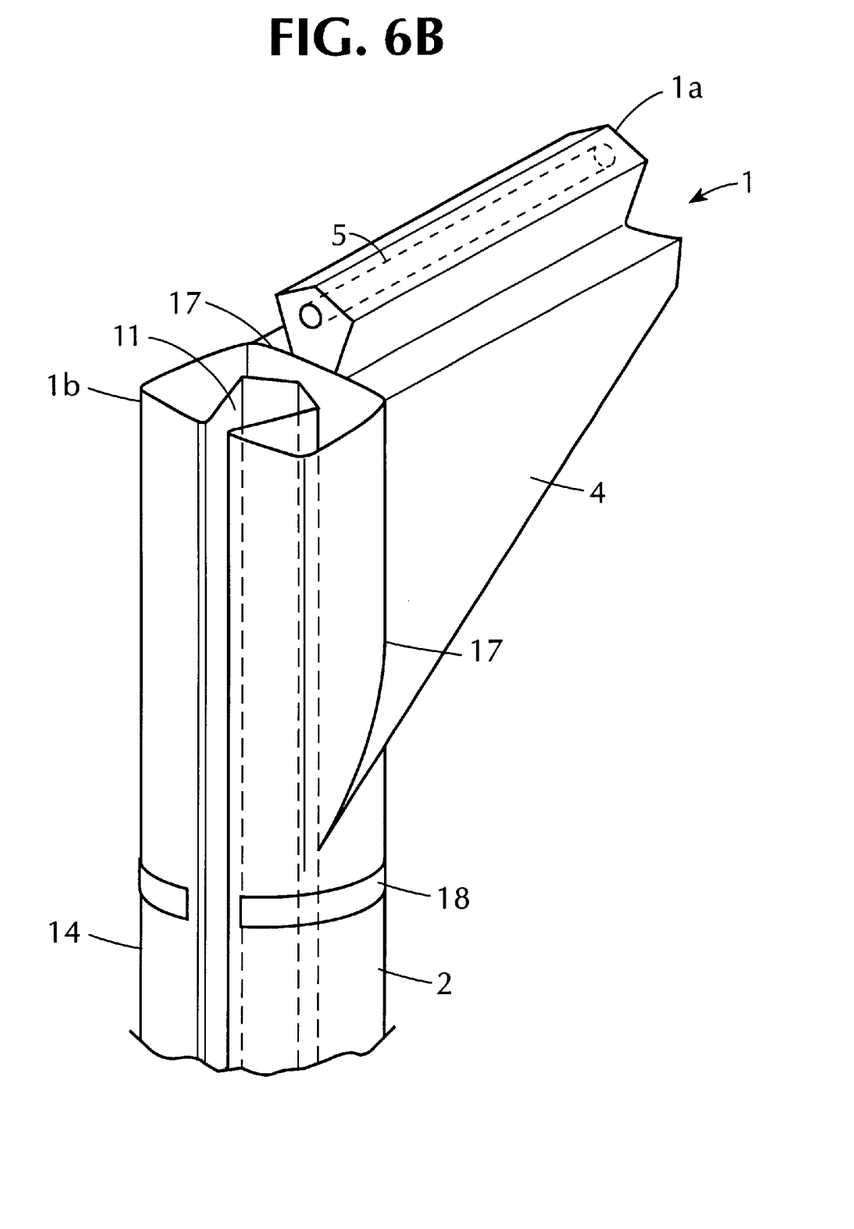
FIG. 6B is a perspective view of yet another embodiment of the present invention.

As noted previously the vacuum connection port 5 may extend from the ring 2. Alternatively, the vacuum connection port 5 can extend either from the connector portion 1b, as shown in FIG. 6A, or from the stopper portion 1a when a longitudinal bore is dug through the connector portion 1a, as shown in FIG. 6B. Similarly, it should be apparent that vacuum connection port 5 could also pass through the support 4 or stopper portion 1a of the embodiment illustrated in FIG. 1.

The present invention also provides a de-airing device that may have multiple vacuum connection ports that are in fluid communication with the longitudinal channel 3. This allows to laminate large size windows without limiting the size of the assembly that can be evacuated. Preferably, this embodiment is used for automotive or architectural glazing.

It is understood that the invention is not limited or restricted to the embodiments described above, as other variation and modifications are possible.

What is claimed is:

1. A device for de-airing different shape and size laminates comprising:

a flexible vacuum ring with two ends having a longitudinal channel imbedded therein that can be matingly mounted about a periphery of a laminate;

a male connector attached to one of said ends of the flexible vacuum ring and not engaged with the longitudinal channel of the end of the flexible vacuum ring the male connector is attached to, wherein the male connector is shaped to slidingly engage the longitudinal channel of the flexible vacuum ring to adjust the flexible vacuum ring to the periphery of the laminate and form an airtight seal between the laminate and the flexible vacuum ring and provide a continuous gas flow path through an entire portion of the flexible vacuum ring mounted about the periphery of the laminate; and a vacuum connection port communicating with the longitudinal channel.

2. The device according to claim 1, wherein a suction source is connected to said vacuum connection port.

3. The device according to claim 2, wherein the suction source is a vacuum pump.

4. The device according to claim 1, wherein the longitudinal channel is made of rubber with a durometer hardness between 20–45 units.

5. The device according to claim 1, wherein the longitudinal channel is shaped such that gas flow therein is not blocked when negotiating angles of the laminate periphery from 30° to 150° while maintaining an airtight seal between the laminate and the flexible vacuum ring.

6. The device according to claim 1, wherein the male connector comprises a connector channel, said connector channel fluidly engaging the longitudinal channel at one end of the flexible vacuum ring to provide gas flow through the flexible vacuum ring mounted about the periphery of the laminate.

7. The device according to claim 1, wherein at least one said vacuum connection port is positioned on said flexible vacuum ring.

8. The device according to claim 6, wherein said vacuum connection port is positioned on said connector channel.

9. The device according to claim 6, wherein said longitudinal channel is shaped to mate with a segment of the periphery of the laminate.

10. The device according to any of the claim 1, wherein the male connector further comprises a support member to enhance the integrity of the connection of the male connector to the flexible vacuum ring.

11. The device according to claim 1, wherein the male connector further comprises a triangular support member that supports the male connector attached to the flexible vacuum ring at an angle of about 90°.

12. A device for de-airing different shape and size laminates comprising:
- a flexible vacuum ring with two ends having a longitudinal channel imbedded therein that can be matingly mounted about a periphery of a laminate;
- a male connector attached adjacent to one of said ends of the flexible vacuum ring and not engaged with the longitudinal channel of the end of the flexible vacuum ring the male connector is attached adjacent to,
- wherein the male connector is shaped to slidingly engage the longitudinal channel of the flexible vacuum ring to adjust the flexible vacuum ring to the entire periphery of the laminate and form an airtight seal between the laminate and the flexible vacuum ring and provide a continuous gas flow path through an entire portion of the flexible vacuum ring mounted about the entire the periphery of the laminate; and
- a vacuum connection port communicating with the longitudinal channel.

13. The device according to claim 12, wherein a suction source is connected to said vacuum connection port.

14. The device according to claim 13, wherein the suction source is a vacuum pump.

15. The device according to claim 12, wherein the longitudinal channel is made of rubber with a durometer hardness between 20–45 units.

16. The device according to claim 12, wherein the longitudinal channel is shaped such that gas flow therein is not blocked when negotiating angles of the laminate periphery from 30° to 150° while maintaining an airtight seal between the laminate and the flexible vacuum ring.

17. The device according to claim 12, wherein at least one said vacuum connection port is positioned on said flexible vacuum ring.

18. The device according to any of the claim 12, wherein the male connector further comprises a support member to enhance the integrity of the connection of the male connector to the flexible vacuum ring.

19. The device according to claim 12, wherein the male connector further comprises a triangular support member that supports the male connector attached to the flexible vacuum ring at an angle of about 90°.

* * * * *

UNITED STATES PATENT AND TRADEMARK OFFICE
CERTIFICATE OF CORRECTION

PATENT NO. : 6,698,485 B1
DATED : March 2, 2004
INVENTOR(S) : Jan H.L. Crommen et al.

It is certified that error appears in the above-identified patent and that said Letters Patent is hereby corrected as shown below:

Title page,
Item [*] Notice, "161" should read -- 60 --.

Column 2,
Line 44, "has" should read -- have --.

Column 3,
Line 19, "multiply" should read -- multi-ply --.

Column 4,
Line 63, "preferable" should read -- preferably --.

Column 6,
Line 60, "any of the" should be deleted.

Column 7,
Line 16, "entire the" should read -- entire --.

Column 8,
Line 13, "any of the" should be deleted.

Signed and Sealed this

Twenty-eighth Day of June, 2005

JON W. DUDAS
*Director of the United States Patent and Trademark Office*